US011007505B2

(12) United States Patent
Ortiz et al.

(10) Patent No.: US 11,007,505 B2
(45) Date of Patent: May 18, 2021

(54) ZEOLITE ADSORBENT MATERIAL, METHOD OF PREPARATION AND USE FOR NON-CRYOGENIC SEPARATION OF INDUSTRIAL GASES

(71) Applicant: Arkema France, Colombes (FR)

(72) Inventors: Guillaume Ortiz, Pau (FR); Cécile Lutz, Gan (FR); Sylvie Szendrovics, Arthez-de-Béarn (FR); Quitterie Persillon, Morlaas (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/465,417

(22) PCT Filed: Dec. 1, 2017

(86) PCT No.: PCT/FR2017/053335
§ 371 (c)(1),
(2) Date: Aug. 28, 2019

(87) PCT Pub. No.: WO2018/100318
PCT Pub. Date: Jun. 7, 2018

(65) Prior Publication Data
US 2019/0388871 A1  Dec. 26, 2019

(30) Foreign Application Priority Data

Dec. 2, 2016 (FR) ...................................... 1661898

(51) Int. Cl.
*B01J 20/18* (2006.01)
*B01D 53/047* (2006.01)
*B01J 20/28* (2006.01)

(52) U.S. Cl.
CPC .......... *B01J 20/183* (2013.01); *B01D 53/047* (2013.01); *B01J 20/186* (2013.01); *B01J 20/2803* (2013.01); *B01D 2253/1085* (2013.01); *B01D 2253/304* (2013.01); *B01D 2256/12* (2013.01); *B01D 2256/16* (2013.01); *B01D 2257/102* (2013.01); *B01D 2257/502* (2013.01)

(58) Field of Classification Search
CPC ........ B01J 20/18; B01J 20/183; B01J 20/186; B01J 20/2803; B01J 20/28002; B01J 20/28004; B01J 20/28019; B01J 20/28016; B01D 53/02; B01D 53/047; B01D 2253/108; B01D 2253/302; B01D 2253/304; B01D 2253/308; B01D 2253/1085; B01D 2257/102; B01D 2257/104; B01D 2257/502; B01D 2256/12; B01D 2256/10; B01D 2256/16
USPC ......... 502/60, 64, 63, 69, 85, 400, 407, 411, 502/414

See application file for complete search history.

(56) References Cited

U.S. PATENT DOCUMENTS

| | | | |
|---|---|---|---|
| 3,140,931 A | 7/1964 | McRobbie | |
| 3,140,933 A | 7/1964 | McKee | |
| 5,256,102 A * | 10/1993 | Heiland | A22C 17/0033 269/266 |
| 5,258,058 A * | 11/1993 | Coe | B01D 53/02 95/96 |
| 5,464,467 A | 11/1995 | Fitch et al. | |
| 6,425,940 B1 | 7/2002 | Chao et al. | |
| 6,478,854 B1 | 11/2002 | Kotagiri et al. | |
| 6,537,348 B1 * | 3/2003 | Hirano | B01D 53/02 95/114 |
| 6,649,556 B2 * | 11/2003 | Masini | B01D 53/02 502/64 |
| 6,652,626 B1 | 11/2003 | Plee | |
| 9,061,918 B2 | 6/2015 | Bouvier et al. | |
| 9,744,519 B2 | 8/2017 | Lutz et al. | |
| 10,099,201 B1 | 10/2018 | Weston et al. | |
| 2001/0045160 A1 * | 11/2001 | Hirano | B01D 53/02 95/96 |
| 2002/0031472 A1 * | 3/2002 | Masini | B01D 53/02 423/700 |
| 2011/0184165 A1 * | 7/2011 | Bouvier | B01J 20/28069 536/127 |

(Continued)

FOREIGN PATENT DOCUMENTS

| | | |
|---|---|---|
| EP | 0893157 A1 | 1/1999 |
| FR | 2766476 A1 | 1/1999 |
| FR | 2925478 A1 | 6/2009 |
| FR | 3028429 A1 | 5/2016 |
| WO | 2008152319 A2 | 12/2008 |
| WO | 2013106017 A2 | 7/2013 |
| WO | 2014176002 A1 | 10/2014 |

OTHER PUBLICATIONS

Alpay, E., et al., "Adsorbent particle size effects in the separation of air by rapid pressure swing adsorption," Mar. 30, 2014, pp. 3059-3075, vol. 49(18), Chemical Engineering Science.
International Search Report and Written Opinion for International Application No. PCT/FR2017/053335, dated Feb. 7, 2018—9 pages.

*Primary Examiner* — Elizabeth D Wood
(74) *Attorney, Agent, or Firm* — RatnerPrestia

(57) ABSTRACT

Provided is a zeolitic adsorbent material. The material is based on LSX zeolite crystals the particle size distribution of which is characterized by a peak width (2σ) in a range from 6.0 to 20.0, limits included, for a number average diameter (d50) in a range from 0.5 μm to 20.0 μm. The material has an Si/Al atomic ratio comprised in a range from 1.00 to 1.15, limits included. The lithium content of the material, expressed by weight of $Li_2O$, is in a range from 9% to 12% by weight relative to the total weight of the material. The material has a non-zeolitic phase (NZP) content such that 0<NZP≤8% by weight relative to the total weight of the material.

12 Claims, 1 Drawing Sheet

(56) References Cited

U.S. PATENT DOCUMENTS

2014/0323289 A1\* 10/2014 Hurst ................... B01J 20/3028
    502/68
2016/0067673 A1\* 3/2016 Bats ..................... B01J 20/3078
    568/751
2018/0214848 A1 8/2018 Bouvier et al.

\* cited by examiner

ZEOLITE ADSORBENT MATERIAL, METHOD OF PREPARATION AND USE FOR NON-CRYOGENIC SEPARATION OF INDUSTRIAL GASES

CROSS-REFERENCE TO RELATED APPLICATIONS

This is the national phase of International Application No. PCT/FR2017/053335, filed Dec. 1, 2017, which claims priority to French Application No. 1661898, filed Dec. 2, 2016. The disclosure of each of these applications is incorporated herein by reference in its entirety for all purposes.

FIELD OF THE INVENTION

The present invention relates to specific adsorbent materials for the non-cryogenic separation of industrial gases, and more particularly for the separation of nitrogen by adsorption in gas flows such as air as well as for the purification of hydrogen by adsorption of carbon monoxide (CO) and/or nitrogen ($N_2$).

BACKGROUND OF THE INVENTION

The separation of nitrogen from gas mixtures is the basis for several non-cryogenic industrial methods, including the production of oxygen from air using the PSA (Pressure Swing Adsorption) method or the VPSA (Vacuum and Pressure Swing Adsorption) method, with the PSA method being one of the most important.

In this application, air is compressed and sent to a column of adsorbent having a marked preference for the nitrogen molecule. In this way, the adsorption cycle produces approximately 94-95% oxygen as well as argon. After a certain time, the column is depressurised and then maintained at the low pressure, during which time the nitrogen is desorbed. Recompression is then ensured by means of a portion of the oxygen produced and/or by air, and then the cycle continues. The advantage of this method over the cryogenic methods lies in the greater simplicity of the plant and greater ease of maintenance.

The amount of adsorbent used is the key to an effective and competitive method. The performance of the adsorbent is linked to a number of factors, among which are, notably, the nitrogen adsorption capacity and the selectivity between nitrogen and oxygen, which will be determining factors in sizing the columns and optimising the production yield (ratio between oxygen produced and oxygen introduced), and the adsorption kinetics, which will allow the cycle time to be optimised and plant productivity to be improved.

The use of molecular sieves as selective nitrogen adsorbents is now a well-known technology. The class of zeolites having a pore diameter of at least 0.4 nm (4 Å) is presented for example in U.S. Pat. No. 3,140,931 for the separation of mixtures of oxygen and nitrogen. The comparative performance of the various ionic forms of the zeolites is described in U.S. Pat. No. 3,140,933, particularly that of the lithium form, which is presented as being the most effective in terms of selectivity.

Patent application FR2766476 describes an enhanced zeolitic adsorbent for the separation of the gases of the air, and the method of obtaining it. This document describes an LSX zeolite-based adsorbent material comprising lithium, optionally potassium, and having a zeoliltised binder. This adsorbent material has a nitrogen adsorption capacity of greater than or equal to 26 $cm^3/g^{-1}$. Said material is manufactured from at least 95% of LSX zeolite (Si/Al molar ratio=1) exchanged with lithium. It has been found, however, that the mechanical strength of these agglomerates can prove to be insufficient in certain applications.

International patent application WO2008/152319 describes a method for preparing zeolitic agglomerates with a zeolite content of more than 70% by weight, a bead diameter ($d_{50}$) of less than 600 µm and a density comprised in a range from 0.5 $g/cm^{-3}$ to 0.8 $g/cm^{-3}$. The zeolites potentially used are the LSX-, X- and A-type zeolites and the agglomerating clays are or are not zeolitisable. This application also describes the optional addition of silica in a proportion of 1% to 5% by weight relative to the total mass of solids (in calcined equivalents) during the preparation of the agglomerates.

U.S. Pat. No. 6,478,854 describes a method for preparing agglomerates based on binderless LiLSX zeolite and the use thereof in gas separation. The agglomerating binder is converted by percolation with a solution of sodium hydroxide and potassium hydroxide having an Na/(Na+K) ratio comprised in a range from 0.1 to 0.4. An aluminium source can be added to the caustic solution to convert the binder preferentially into LSX zeolite. The conversion of the binder into LSX is measured by an intensity ratio of the peaks in the diffractogram, between the peak corresponding to diffraction plane (Miller index) 220 and the peak corresponding to diffraction plane 311.

International patent application WO2013/106017 describes a method for preparing binderless X zeolite with an Si/Al atomic ratio comprised in a range from 1.0 to 1.5 that can be used, after agglomeration and exchange with barium, for the separation of xylene isomers. The size of the crystals of X zeolite is 2.7 µm and the size of the crystals of binder converted into zeolite (from 5% to 30% by weight relative to the total mass of zeolite) is not defined. The binder is also partially converted into zeolite A.

International patent application WO2014/176002 describes a method for preparing an agglomerated adsorbent material from a choice between two binders having different particle sizes, zeolitisation, then exchange with lithium. It is also possible to add a liquid or solid silica source in order to zeoliltise the binder into X zeolite, for which the Si/Al atomic ratio can differ from that of the initial zeolite.

The current importance of non-cryogenic industrial gas separation methods employing zeolitic adsorbent materials (also known as "molecular sieves") shows that the discovery and development of increasingly high-performance adsorbents is a major objective both for gas-producing companies and companies supplying said molecular sieves.

Consequently, one of the purposes of the present invention is the provision of zeolitic adsorbent materials having an enhanced adsorption capacity relative to the existing zeolitic adsorbent materials such as LiLSX with zeoliltised binder, for the separation of industrial gases, particularly of nitrogen and oxygen.

It has now been found that it is possible to produce high-capacity zeolitic adsorbent materials, from LSX zeolite crystals, containing lithium, for the non-cryogenic separation of industrial gases by (V)PSA, particularly for the separation of nitrogen and oxygen ($N_2/O_2$), and especially for the preparation of medical oxygen from air, and also for the industrial preparation of oxygen by (V)PSA.

SUMMARY OF THE INVENTION

Thus, and according to a first aspect, the present invention relates to a zeolitic adsorbent material:

based on LSX zeolite crystals the particle size distribution of which is characterised by a peak width (2σ) comprised in a range from 6.0 to 20.0, limits included, for a number average diameter ($d_{50}$) comprised in a range from 0.5 μm to 20.0 μm, with an Si/Al atomic ratio comprised in a range from 1.00 to 1.15, limits included, the lithium content of which, expressed by weight of $Li_2O$, comprised in a range from 9% to 12% by weight relative to the total weight of the zeolitic adsorbent material, and with a non-zeolitic phase (NZP) content such that 0<NZP≤8% by weight relative to the total weight of the zeolitic adsorbent material.

DETAILED DESCRIPTION OF THE INVENTION

Figure 1:
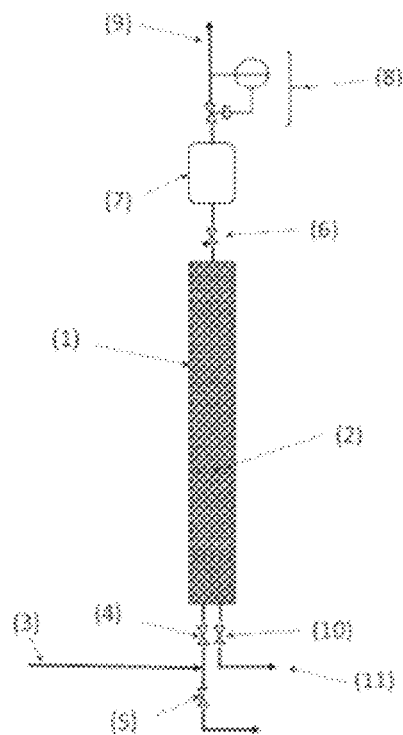
FIG. 1 illustrates a column (1) filled with zeolitic absorbent material (2), which is intermittently fed with dry air (3) by means of a valve (4), where the time for feeding the column (1) with the flow (3) is called absorption time. When the column (1) is not fed with dry air, the flow (3) is discharged into the atmosphere by the valve (5). The zeolithic abosrbent material preferentially adsorbs nitrogen, such that an oxygen-enriched air leaves the column via the check valve (6), and moves to a buffering tank (7). A regulating valve (8) continuously delivers the gas at the outlet (9) at a constant flow rate. When the column (1) is not fed, i.e., when the valve (4) is closed and the valve (5) is open, the column (1) is depressurised by the valve (10) to the atmosphere (11), for a period called the desportion time.

The LSX zeolite crystals which form the basis of the zeolitic adsorbent material of the present invention have an Si/Al atomic ratio of 1.00±0.05, limits included.

It has been found that the particle size distribution of the crystals of the zeolitic adsorbent material of the present invention is one of the parameters enabling the high capacity desired for the separation of gases to be achieved.

Thus, the particle size distribution is typically a Gaussian distribution in which the peak width (2σ) is most often comprised in a range from 6.0 to 20.0, preferably from 8.0 to 18.0, more specifically from 9.0 to 17.0, and most preferably from 10.0 to 16.0, limits included. This particle size distribution is also characterised by a number-average diameter ($d_{50}$) of the LSX zeolite crystals comprised in a range from 0.5 μm to 20.0 μm, preferably from 1.0 μm to 15.0 μm, more preferably from 4.0 μm to 12.0 μm.

Moreover, and as indicated above, the zeolitic adsorbent material comprises a certain amount of non-zeolitic phase, referred to as NZP, said amount being preferably 0<NZP≤6%, more preferably 0.5%≤NZP≤4%, measured by XRD, by weight relative to the total weight of the zeolitic adsorbent material.

The possible different types of zeolite present in the zeolitic adsorbent material are determined by XRD. The total amount of zeolite(s) is also measured by XRD and is expressed in % by weight relative to the total weight of the adsorbent material.

Consequently, in the present invention, the term, "non-zeolitic phase", (or "NZP"), denotes any phase present in the zeolitic adsorbent material according to the invention, other than the zeolite or zeolites present in said zeolitic adsorbent material, which is called "zeolitic phase", or "ZP". The amount of non-zeolitic phase is expressed by the balance to 100% of the zeolitic phase of the adsorbent, i.e., according to the following equation:

% NZP=100−% ZP, where % NZP represents the percentage by weight of non-zeolitic phase and % ZP the percentage by weight of zeolitic phase, relative to the total weight of the zeolitic adsorbent material.

Thus, and as indicated above, the NZP of the zeolitic adsorbent material according to the present invention is such that 0<NZP≤8%, preferably 0<NZP≤6%, more preferably 0.5%≤NZP≤4%.

The zeolitic adsorbent material which can be used in the context of the present invention, whether in the form of beads, extrudates or other forms, generally has a volume mean diameter, or an average length (greatest dimension when it is not spherical) of less than or equal to 7 mm, preferably comprised in a range from 0.05 mm to 7 mm, more preferably from 0.2 mm to 5 mm.

The zeolitic adsorbent materials that are of use in the context of the present invention also have mechanical properties that are particularly suitable for the applications to which they are destined, i.e.:

either a bulk crushing strength (BCS), measured according to standard ASTM 7084-04, of greater than 1.5 MPa, preferably greater than 2.0 MPa, preferably greater than 2.5 MPa, for a material with a volume mean diameter ($d_{50}$) or a length (greatest dimension when the material is not spherical) of less than 1 mm, limits included, or a grain crushing strength, measured according to standards ASTM D 4179 (2011) and ASTM D 6175 (2013), comprised in a range from 0.5 daN to 30 daN, preferably from 1 daN to 20 daN, for a material with a volume mean diameter ($d_{50}$) or a length (greatest dimension when the material is not spherical) greater than or equal to 1 mm, limits included.

More specifically, and according to a preferred embodiment of the invention, the zeolitic adsorbent material takes the form of beads having a volume mean diameter comprised in a range from 0.05 to 5 mm, limits included. More preferably, and more specifically for medical oxygen preparation applications, this volume mean diameter is comprised in a range from 0.05 mm to 1.0 mm, even more preferably from 0.15 mm to 0.65 mm; and most preferably from 0.25 mm to 0.55 mm. For applications such as the separation of industrial gases, this volume mean diameter can be more specifically and more generally comprised in a range from 1.0 mm and 5.0 mm.

Another preferred feature of the zeolitic adsorbent material of the invention is its apparent density, which is generally comprised in a range from 0.58 $kg/m^{-3}$ to 0.80 $kg/m^{-3}$, preferably from 0.60 $kg/m^{-3}$ to 0.75 $kg/m^{-3}$, more preferably from 0.62 $kg/m^{-3}$ to 0.70 $kg/m^{-3}$.

The invention also relates to a method for preparing zeolitic adsorbent material according to the invention, which comprises the following steps:

a/ agglomerating LSX zeolite crystals with an agglomerating binder and a silica source, followed by shaping, drying and calcining of the agglomerated crystals, b/ zeolitisation of the binder by the action of a basic alkaline solution, c/ replacing the major part of the cations at the exchangeable sites of the product obtained in step b/ by lithium cations, followed by washing and drying of the product thus treated, and d/ optional drying, and activating the zeolitic adsorbent material obtained.

The LSX zeolite used in step a/ of the method described above is, as indicated earlier, a faujasite-type zeolite having an Si/Al atomic ratio of 1.00±0.05, limits included, the particle size distribution of which is typically a Gaussian distribution with a peak width ($2\sigma$) most often comprised in a range from 6.0 to 20.0, preferably from 8.0 to 18.0, most preferably from 10.0 to 16.0, with a number-average diameter ($d_{50}$) of the crystals comprised in a range from 0.5 µm to 20.0 µm, preferably from 1.0 µm to 15.0 µm, more preferably from 4.0 µm to 12.0 µm.

These zeolite crystals can be prepared by any means known to the person skilled in the art, and can for example be obtained by a method similar to that described in FR2925478, except that the crystallization is carried out with low-shear or even slight-shear agitation, typically with a shear rate of less than 20 $s^{-1}$, preferably less than 15 $s^{-1}$, more preferably less than 10 $s^{-1}$.

In the above preparation method, all of the amounts indicated are expressed in calcined equivalents, i.e., by weight or as mass percentages, after subtraction of the loss on ignition (LOI) measured for each ingredient introduced. In this step a/ it is also possible to use crystals of LSX zeolite which has been at least partially exchanged for rare earths, as described for example in U.S. Pat. No. 5,464,467.

The amount by weight of LXS zeolite crystals is generally comprised in a range from 75% to 90% by weight relative to the total weight of said product obtained at the end of step a/, and the amount of zeolitisable clay is generally comprised in a range from 5% to 25% by weight relative to the total weight of said product obtained at the end of step a/.

The silica source is added in an amount of from 0.1% to 10% by weight, preferably from 0.2% to 6% by weight, relative to the total weight of said product obtained at the end of step a/. The silica source that can be used is of any type known per se, and for example is solid silica, colloidal silica, sodium silicate, and other sources well known to the person skilled in the art.

The shaping in step a/ is carried out according to techniques that are well known to the person skilled in the art. Likewise, drying and calcining are carried out according to the conventional descriptions that are also well known to the person skilled in the art. Accordingly, drying is typically carried out at a temperature comprised in a range from 50° C. to 200° C. Calcining can be performed by any calcining method known to the person skilled in the art, and for example, without limitation, calcining can be performed under a flow of oxidizing and/or inert gas, in particular with gases such as oxygen, nitrogen, air, dry and/or decarbonated air, oxygen-depleted air, which can optionally be dry and/or decarbonated, at one or more temperatures greater than 200° C., typically comprised in a range from 250° C. to 700° C., preferably from 300° C. to 650° C., for several hours, for example from 2 to 6 hours.

The agglomerating binder used in step a/ can be of any type known to the person skilled in the art, and preferably contains at least 80% by weight of zeolitisable clay(s) (called "zeolitisable part") relative to the total weight of the agglomerating binder.

The term "zeolitisable clay(s)" refers to a clay or mixture of clays that can be converted into zeolitic matter by the action of an alkaline basic solution, by techniques which are now well known to the person skilled in the art.

The zeolitisable clays which can be used in the context of the present invention typically belong to the class of kaolinites, halloysites, nacrites, dickites, kaolins and/or metakaolins, to which a silica source can also be added, as described above.

It is also possible to incorporate one or more other types of non-zeolitisable clays, such as, for example and without limitation, clays selected from attapulgites, sepiolites, bentonites, montmorillonites, and others. This embodiment, however, is not preferred.

It is also possible, in agglomeration step a/, to incorporate one or more organic additives, particularly with the aim of facilitating shaping and/or of imparting particular properties to the agglomerated material, such as mechanical stability, porous profiles, and others. These additives are well known to the person skilled in the art and can be incorporated in quantities comprised in a range from 0 to 5% by weight relative to the total weight of said product obtained at the end of step a/.

By means of zeolitisation step b/, at least 50% and preferably at least 70%, more preferably at least 80% and even more preferably at least 85%, by weight of the zeolitisable clay or clays contained in the binder is converted into zeolitic matter; it is found that zeolitisation makes it possible in particular to enhance the mechanical strength of the agglomerated zeolitic adsorbents.

Zeolitisation can be carried out by immersing the agglomerate in an alkaline basic solution, generally an aqueous solution, for example an aqueous solution of sodium hydroxide and/or potassium hydroxide, with a concentration of preferably greater than 0.5 M. Said concentration is generally less than 5 M, preferably less than 4 M, advantageously less than 3 M. Zeolitisation is performed preferably at high temperature (temperature greater than the ambient temperature), typically at temperatures on the order of 80° C. to 100° C., so as to improve the kinetics of the method and thus reduce the immersion times to less than 8 hours. However, operating at lower temperatures and with longer immersion times would not be outside the scope of the invention. Nor would it be outside the scope of the invention to add, during this zeolitisation step, a solid or liquid silica source to the basic alkaline solution, for example sodium silicate or dissolved silica.

According to this procedure, and as indicated above, it is easy to obtain zeolitisation of at least 50%, and preferably at least 70%, more preferably at least 80% and even more preferably at least 85%, by weight of the zeolitisable clay or clays present in the binder. The next step is washing with water, followed by drying.

Step c/ of replacing the cations at the exchangeable sites of the product obtained in step b/ by lithium cations is carried out according to methods which are likewise well known to the person skilled in the art and are described for example in patent EP0893157.

In the present application, "exchangeable sites" refers to all of the exchangeable sites in the LSX zeolite crystals and also the exchangeable sides formed during zeolitisation of the binder. In a preferred embodiment of the invention, the lithium exchange is carried out such that the lithium content (expressed as lithium oxide $Li_2O$) in the zeolitic adsorbent material of the invention is comprised in a range from 9% to 12% by weight relative to the total weight of the zeolitic adsorbent material.

In addition to the exchange with lithium cations, it is also possible to carry out an exchange with one or more other cations from groups IA, IIA, IIIA and IIIB (respectively, columns 1, 2, 13 and 3) of the periodic table of the elements, but also with one or more other trivalent ions from the series of the lanthanides or rare earths, the zinc(II) ion, the copper (II) ion, the chromium(III) ion, the iron(III) ion, the ammonium ion and/or the hydronium ion.

The purpose of the activation step (step d/), which is the last step in the method of obtaining the zeolitic adsorbent material according to the invention, is to fix the water content and also the loss on ignition of the adsorbent within optimum limits. The general procedure is a thermal activation, which is performed preferably at from 300° C. to 600° C. for a certain time, typically from 1 to 6 hours, depending on the desired water content and desired loss on ignition and according to the intended use of the adsorbent.

The zeolitic adsorbent material according to the present invention can be especially advantageously used as a nitrogen-adsorbing material for the separation of gases in the air, and as excellent nitrogen adsorbents and/or carbon monoxide adsorbents for the purification of hydrogen.

The zeolitic adsorbent material according to the present invention most often has a nitrogen ($N_2$) adsorption capacity, measured under 1 bar at 25° C., that is greater than 24 $Ncm^3/g^{-1}$, preferably greater than 25 $Ncm^3/g^{-1}$, more preferably greater than 26 $Ncm^3/g^{-1}$, and typically greater than 26.5 $Ncm^3/g^{-1}$, even more preferably greater than 27 $Ncm^3/g^{-1}$.

The adsorption methods employing the zeolitic adsorbent material according to the present invention are most often PSA, USA or VPSA methods, and preferably PSA or VPSA methods, for $N_2/O_2$ separation of industrial gases and for $N_2/O_2$ separation in medical oxygen production apparatus.

The zeolitic adsorbent material according to the present invention therefore finds especially advantageous application as an adsorption element in oxygen concentrators for respiratory assistance. According to a particularly advantageous aspect of the invention, the zeolitic adsorbent material according to the invention constitutes the active matter of a consumable cartridge of zeolitic adsorbent that can be inserted into an oxygen concentrator for respiratory assistance, this concentrator being alternatively transportable, mobile, preferably portable.

The consumable cartridge of zeolitic adsorbent can have any form suitable for easy insertion and replacement in oxygen concentrators for respiratory assistance. According to one embodiment, said cartridge can be produced from the zeolitic adsorbent material according to the invention in the form of beads which are made mutually cohesive by means of at least one resin, preferably a polymeric resin selected preferably from thermoplastic homo- and/or copolymers and polycondensates.

Non-limiting examples of such polymeric resins are polyolefins, particularly low- and/or high- and/or ultra-high-density polyethylene, polypropylene, ethylene copolymers, ethylene-vinyl acetate copolymers, polyacrylics, acrylonitrile homo- and/or copolymers, polyacrylates, polymethacrylates, acrylate copolymers and/or methacrylate copolymers, polystyrenes and/or styrene copolymers, polyesters, e.g. polyethylene terephthalate, polybutylene terephthalate, halogenated polymers and copolymers such as poly(vinylidene difluoride) (PVDF) polymers, poly(tetrafluoroethylene) (PTFE) polymers and/or copolymers, polyamides, such as polyamide-11 and polyamide-12, and also other even- and odd-numbered polyamides, aromatic polyamides, polyvinyl chlorides, polyurethanes, polyethersulfones, polyetherketones, polycarbonates, epoxy resins, phenolic resins, thermosetting resins and elastomeric resins, and the like, and also mixtures of two or more of these in any proportions.

As a variant, the consumable cartridge can comprise, in addition to or in place of the zeolitic adsorbent material, a fixed bed of zeolitic adsorbent material according to the invention.

According to yet another aspect, the invention relates to an oxygen concentrator for respiratory assistance that is transportable, mobile, preferably portable, comprising at least one zeolitic adsorbent material, or at least one fixed adsorption bed, or at least one composite material, or at least one cartridge, as has just been described above.

It has been observed that the zeolitic adsorbent material according to the present invention has better volume efficacy than the currently-available adsorbent materials. This gain in volume efficacy offers numerous advantages, of which one of the main ones is that of allowing a reduction in the size of equipment, particularly of oxygen concentrators for respiratory assistance.

More particularly, the zeolitic adsorbent material according to the present invention has a better volume capacity for nitrogen ($N_2$) adsorption than the known, commercially available adsorbent materials with non-zeolitic binder, but also a better volume capacity for nitrogen ($N_2$) adsorption than the adsorbent materials with a zeoliltised binder that are known in the prior art, for example in patent EP0893157.

The zeolitic adsorbent material according to the invention also has the dual advantage of a high mass adsorption capacity combined with a high agglomerate density due to the particular particle size distribution of the crystals, which makes it possible to obtain a high degree of compactness. Furthermore, the zeolitic adsorbent material according to the invention has very good mechanical properties, and in particular a very high bulk crushing strength (BCS).

The physical properties of the zeolitic adsorbent material according to the invention are evaluated by methods known to the person skilled in the art, the main ones among them being recited below.

The number-average diameter of the LSX zeolite crystals used for preparing the zeolitic adsorbent material of the invention is estimated by observation under a scanning electron microscope (SEM).

In order to estimate the size of the zeolite crystals on the samples, a set of images is taken at a magnification of at least 5000. The diameter of at least 200 crystals is then measured using dedicated software, for example the Smile View software published by LoGraMi. Accuracy is on the order of 3%.

The size recorded for each crystal is that of the largest cross section of said crystal in question. Particles having a size of less than 0.5 µm which might possibly be present in the zeolitic adsorbent material are not taken into consideration in the counting.

The resulting particle size distribution is equivalent to the average of the particle size distributions observed for each of the images. The peak width and the number-average diameter are calculated by conventional methods known to the person skilled in the art, applying the statistical rules of Gaussian distribution.

The average volume diameter (or "volume mean diameter") of the zeolitic adsorbent material of the invention is determined by analysis of the particle size distribution of a sample of adsorbent material by imaging in accordance with standard ISO 13322-2:2006, using a conveyor belt which allows the sample to pass in front of the camera lens.

The volume-average diameter is then calculated from the particle size distribution by applying standard ISO 9276-2: 2001. In the present document, the term "volume-average diameter" or "size" is used for the zeolitic adsorbent materials. Accuracy is on the order of 0.01 mm for the size range of the zeolitic adsorbent materials of the present invention.

Elemental chemical analysis of a zeolitic adsorbent material according to the invention can be carried out according to various analytical techniques which are known to the person skilled in the art. These techniques include the technique of chemical analysis by X-ray fluorescence as described in standard NF EN ISO 12677:2011 on a wavelength-dispersive spectrometer (WDXRF), for example Tiger S8 from Bruker.

X-ray fluorescence is a non-destructive spectral technique using the photoluminescence of atoms in the field of X-rays to establish the elemental composition of a sample. Excitation of the atoms, generally with an X-ray beam or by electron bombardment, generates specific radiations after return to the ground state of the atom. After calibrating for each oxide, a measurement uncertainty of less than 0.4% by weight is obtained in a conventional way.

Other methods of analysis are for example illustrated by the methods by atomic absorption spectrometry (AAS) and atomic emission spectrometry with high-frequency induced plasma (ICP-AES) described in standards NF EN ISO 21587-3 or NF EN ISO 21079-3 on a Perkin Elmer 4300DV type apparatus, for example.

The X-ray fluorescence has the advantage of depending very little on the chemical combination of the element, which offers a precise determination, both quantitative and qualitative, After calibration for each $SiO_2$ and $Al_2O_3$ oxide, and also the various oxides (such as those originating from the exchangeable cations, for example sodium), a measurement uncertainty of less than 0.4% by weight is conventionally obtained. The ICP-AES method is particularly suitable for measuring the lithium content which makes it possible to calculate the lithium oxide content.

Thus, the elemental chemical analyses described above make it possible to verify both the Si/Al ratio of the zeolite used in the zeolitic adsorbent material and the Si/Al ratio of the zeolitic adsorbent material. In the description of the present invention, the measurement uncertainty for the Si/Al ratio is ±5%. The Si/Al ratio of the zeolite present in the adsorbent material can also be measured by solid silicon nuclear magnetic resonance (NMR) spectroscopy.

The quality of the ion exchange is linked to the number of moles of the cation in question in the zeolitic adsorbent material after exchange. More specifically, the degree of exchange by a given cation is estimated by evaluating the ratio between the number of moles of said cation and the number of moles of all of the exchangeable cations. The respective amounts of each of the cations are evaluated by chemical analysis of the corresponding cations. For example, the degree of exchange by the sodium ions is estimated by evaluating the ratio between the total number of $Na^+$ cations and the total number of exchangeable cations (for example $Ca^{2+}$, $K^+$, $Li^+$, $Ba^{2+}$, $Cs^+$, $Na_+$, etc.), the amount of each of the cations being evaluated by chemical analysis of the corresponding oxides ($Na_2O$, CaO, $K_2O$, BaO, $Li_2O$, $Cs_2O$, etc.). This method of calculation also takes into account the possible oxides present in the residual binder of the zeolitic adsorbent material. However, the amount of such oxides is considered to be minor compared with the oxides originating from the cations of the exchangeable sites of the zeolite(s) of the zeolitic adsorbent material according to the invention.

The bulk crushing strength of the zeolitic adsorbent materials as described in the present invention is characterised according to standard ASTM 7084-04. The mechanical grain crushing strengths are determined with a "Grain crushing strength" apparatus sold by Vinci Technologies, according to standards ASTM D 4179 and D 6175.

The apparent density of the zeolitic adsorbent material according to the present invention is measured as described in standard DIN 8948/7.6.

The loss on ignition of the zeolitic adsorbent material according to the invention is determined in an oxidizing atmosphere, by calcining the sample in air at a temperature of 950° C.±25° C., as described in standard NF EN 196-2 (April 2006). The measurement standard deviation is less than 0.1%.

The purity of the zeolites in the zeolitic adsorbent materials of the invention is evaluated by X-ray diffraction analysis, known to the person skilled in the art by the acronym XRD. This identification is carried out on a Bruker XRD apparatus.

This analysis makes it possible to identify the various zeolites present in the adsorbent material since each of the zeolites has a unique diffractogram defined by the positioning of the diffraction peaks and by their relative intensities.

The zeolitic adsorbent materials are ground and then spread out and smoothed on a sample carrier by simple mechanical compression. The conditions under which the diffractogram created on the Bruker D5000 apparatus is acquired are as follows:

Cu tube used at 40 kV-30 mA;
slit size (divergent, scattering and analysis slits)=0.6 mm;
filter: Ni;
sample device rotating at: 15 $rpm^{-1}$;
measuring range: $3°<2\theta<50°$;
increment: 0.02°;
counting time per increment: 2 seconds.

The interpretation of the diffractogram obtained is done with EVA software, identifying zeolites using the ICDD PDF-2 database, version 2011.

The amount of the FAU zeolite fractions, by weight, is measured by XRD analysis; this method is also used to measure the amount of the zeolite fractions other than FAU. This analysis is performed on a Bruker machine, and the amount by weight of the zeolite fractions is then evaluated using the TOPAS software from Bruker.

The mass adsorption capacity at 25° C., under 1 bar, of the zeolitic adsorbent material is determined from the measurement of the adsorption isotherm for gases such as nitrogen or oxygen, at 25° C.

Prior to the adsorption, the zeolitic adsorbent material is degassed at from 300° C. to 450° C. for from 9 to 16 hours under vacuum (pressure lower than $6.7.10^{-4}$ Pa), Measurement of the adsorption isotherms is then performed on a machine such as ASAP 2020 from Micromeritics, taking at least 10 pressure measurement points at relative pressures of ratio P/P0 between 0.001 and 1.

The mass adsorption capacity of the zeolitic adsorbent material is read for the isotherm at 25° C. under a pressure of 1 bar, and is expressed in $Ncm^3\ g^{-1}$.

The volume adsorption capacity at 25° C., under 1 bar, of the zeolitic adsorbent material is calculated from the mass adsorption capacity as defined above, by multiplying said mass absorption capacity by the apparent density of said zeolitic adsorbent material. The apparent density is measured as described in standard DIN 8948/7.6.

The present invention is now described with the aid of the following examples, the aim of which is to illustrate certain embodiments of the invention, without, however, limiting the scope of said invention as claimed in the appended claims.

Example 1 (Comparative): Preparation of a Zeolitic Adsorbent Material with LSX Crystals of $2\sigma=1.2$ and of $d_{50}=1.3$ μm, According to FR2925478

In the following example, the masses given are expressed as calcined equivalents.

A homogeneous mixture is prepared, consisting of 1700 g of LSX zeolite crystals of $2\sigma=1.2$ and of $d_{50}=1.3$ μm, as described in FR2925478, with a shear rate of 135 s$^{-1}$, 300 g of Charentes kaolinite, and an amount of water such that the loss on ignition of the paste before shaping is 39%. The paste thus prepared is used on a granulator plate to produce beads of agglomerated zeolitic adsorbent material.

The beads obtained are selected by sieving in order to recover beads with a diameter comprised in a range from 0.3 mm to 0.8 mm and a volume-average diameter of 0.50 mm.

The beads are dried overnight in a ventilated oven at 80° C. They are subsequently calcined at 550° C. for two hours under a flow of decarbonated dry air.

After cooling, 100 g of these (agglomerated) beads are immersed in 750 mL of aqueous sodium hydroxide solution with a concentration of 100 g/L$^{-1}$, at a temperature set at 98° C. The system is held at temperature with gentle stirring for three hours. The agglomerates are then washed with water until the final pH of the wash water is close to 10.

Next, five successive exchanges are carried out using 1 M lithium chloride solutions, in a proportion of 20 ml/g$^{-1}$ of solid. Each exchange is continued for four hours at 100° C., and intermediate washes are carried out, thus making it possible to remove the excess salt at each step. In the final step, four washes are carried out at ambient temperature, in a proportion of 20 ml/g$^{-1}$.

The beads are dried overnight in a ventilated oven at 80° C. They are subsequently activated at 550° C. for two hours under a blanket of decarbonated dry air.

The lithium oxide $Li_2O$ content, determined by ICP-AES, is 10.6% by weight relative to the total weight of the zeolitic adsorbent material. The volume-average diameter of the beads is 0.50 mm. The mechanical bulk crushing strength of the beads of lithium-exchanged LSX zeolite is 1.4 MPa, the apparent density is 0.58 kg/m$^{-3}$, the Si/Al ratio of the zeolitic material is 1.02, and the NZP is 3%

The mass adsorption capacity at 25° C. under 1 bar is 24.7 Ncm$^3$ g$^{-1}$.

Example 2 (According to the Invention): Preparation of a Zeolitic Adsorbent Material with LSX Crystals of $2\sigma=11.6$ and of $D_{50}=5.6$ μM A homogeneous mixture is prepared consisting of 1700 g of LSX zeolite crystals of $2\sigma=11.6$ and of $d_{50}=5.6$ μm, as described in FR2925478 but with a shear rate of 5 s$^{-1}$, 300 g of Charentes kaolinite, 40 g (as calcined equivalents) of colloidal silica sold under the name Klebosol® 30, and an amount of water such that the loss on ignition of the paste before shaping is 39%.

The zeolitic adsorbent material is subsequently prepared according to the protocol described in example 1.

The nithium oxide $Li_2O$ content, determined by ICP-AES, is 10.7% by weight relative to the total weight of the zeolitic adsorbent material. The volume-average diameter of the beads is 0.50 mm. The mechanical bulk crushing strength (BCS) of the beads of lithium-exchanged LSX zeolite is 2.6 MPa, the apparent density is 0.63 kg/m$^{-3}$, the Si/Al ratio of the zeolitic material is 1.03, and the NZP is 2.7%.

The mass adsorption capacity at 25° C. under 1 bar is 27 Ncm$^3$ g$^{-1}$.

Example 3: $N_2/O_2$ Separation Tests on a Fixed Bed of Adsorbent with Pressure Swing Adsorption (PSA)

An $N_2/O_2$ separation test is carried out by adsorption in a single column in accordance with the principle presented in "*Adsorbent particle size effects in the separation of air by rapid pressure swing adsorption*", by E. Alpay et al., *Chemical Engineering Science*, 49(18), 3059-3075, (1994).

FIG. 1 describes the assembly produced. A column (1) of internal diameter equal to 27.5 mm and of internal height equal to 600 mm, filled with zeolitic adsorbent material (2), is intermittently fed with dry air (3) by means of a valve (4). The time for feeding the column (1) with the flow (3) is called adsorption time. When the column (1) is not fed with dry air, the flow (3) is discharged into the atmosphere by the valve (5). The zeolitic adsorbent material preferentially adsorbs nitrogen, such that an oxygen-enriched air leaves the column via the check valve (6), and moves to a buffering tank (7). A regulating valve (8) continuously delivers the gas at the outlet (9) at a constant flow rate fixed at 1 NL/min$^{-1}$.

When the column (1) is not fed, i.e., when the valve (4) is closed and the valve (5) is open, the column (1) is depressurised by the valve (10) to the atmosphere (11), for a period called the desorption time. The adsorption and desorption phases follow on from one another. The durations of these phases are fixed from one cycle to the next and they are adjustable. Table 1 shows the respective state of the valves according to the adsorption and desorption phases.

TABLE 1

| Adsorption phase | Desorption phase |
| --- | --- |
| Valve (4) open | Valve (4) closed |
| Valve (5) closed | Valve (5) open |
| Valve (10) closed | Valve (10) open |

When the column (1) is not fed, i.e., when the valve (4) is closed and the valve (5) is open, the column (1) is depressurised by the valve (10) to the atmosphere (11), for a period called the desorption time. The adsorption and desorption phases follow on from one another. The durations of these phases are fixed from one cycle to the next and they are adjustable. Table 1 shows the respective state of the valves according to the adsorption and desorption phases.

The tests are carried out in succession with the zeolitic adsorbent materials in example 1 and example 2. The column is loaded at constant volume, with respectively 219 g and 228.5 g of adsorbent materials. The pressure at the inlet is set at 280 kPa relative.

The flow rate at the outlet is set at 1 NL/min$^{-1}$. The adsorption time is set at 1 s. The adsorption time varies from 2 s to 4.5 s.

The oxygen concentration at the outlet (9) is measured using a Servomex 570A oxygen analyser.

Figure 2:
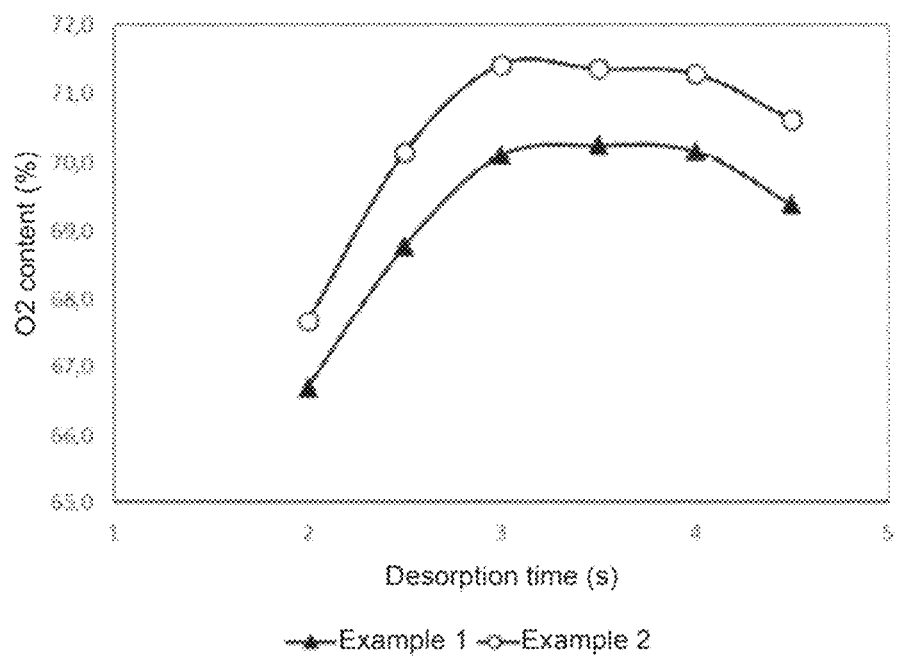
FIG. 2 illustrates the oxygen content of the flow produced at the outlet (9) according to the desorption time set for the materials in Example 1 and Example 2..

FIG. 2 shows the oxygen content of the flow produced at the outlet (9) according to the desorption time set for the materials in example 1 and example 2. The material in example 2 proves to be much more effective in terms of oxygen content of the gas produced than the solid in example 1.

The invention claimed is:

1. A zeolitic adsorbent material comprising:
   a particle size distribution, based on LSX zeolite crystals, that is a Gaussian distribution characterised by a peak width ($2\sigma$) in a range from 9.0 to 17.0, limits included, for a number average diameter ($d_{50}$) in a range from 0.5 µm to 20.0 µm,
   the zeolitic adsorbent material having an Si/Al atomic ratio in a range from 1.00 to 1.15, limits included,
   the zeolitic adsorbent material having a lithium content, expressed by weight of $Li_2O$, in a range from 9% to 12% by weight relative to the total weight of the zeolitic adsorbent material, and
   the zeolitic adsorbent material having a non-zeolitic phase (NZP) content such that 0<NZP≤8% by weight relative to the total weight of the zeolitic adsorbent material.

2. The material according to claim 1, wherein the number-average diameter ($d_{50}$) of the LSX zeolite crystals is in a range from 1.0 µm to 15.0 µm.

3. The material according to claim 1, wherein the non-zeolitic phase (NZP) is present in an amount of 0.5%≤NZP≤4% by weight relative to the total weight of the zeolitic adsorbent material.

4. The material according to claim 1, which is in the form of beads with a volume mean diameter of between 0.05 mm and 5 mm, limits included.

5. The material according to claim 1, having an apparent density in a range from 0.58 $kg/m^{-3}$ to 0.80 $kg/m^{-3}$.

6. A method for preparing the zeolitic adsorbent material according to claim 1, comprising:
   agglomerating LSX zeolite crystals with an agglomerating binder and a silica source, followed by shaping, drying and calcining of the agglomerated crystals,
   zeolitising the binder by the action of a basic alkaline solution,
   replacing the major part of the cations at the exchangeable sites of the product obtained in the zeolitising step by lithium cations, followed by washing and drying of the product thus treated, and
   optionally drying, and activating the zeolitic adsorbent material obtained.

7. The method according to claim 6, wherein at the end of the agglomerating step, the amount by weight of LSX zeolite crystals is in a range from 75% to 90% by weight relative to the total weight of said product obtained at the end of the agglomerating step and the amount of zeolitisable clay is in a range from 5% to 25% by weight relative to the total weight of said product obtained at the end of the agglomerating step.

8. The method according to claim 6, wherein the silica source is added in an amount such that at the end of the agglomerating step, the silica source represents from 0.1% to 10% by weight, relative to the total weight of said product obtained at the end of the agglomerating step.

9. The method according to claim 6, wherein the agglomerating binder contains at least 80% by weight of zeolitisable clay(s), said zeolitisable clays selected from the group consisting of kaolinites, halloysites, nacrites, dickites, kaolins and/or metakaolins.

10. A nitrogen-adsorbent material or a carbon monoxide-adsorbent material comprising the zeolitic adsorbent material according to claim 1.

11. A consumable cartridge of zeolitic adsorbent, comprising at least one zeolitic adsorbent material according to claim 1.

12. An oxygen concentrator for respiratory assistance, which is transportable, mobile, comprising at least one zeolitic adsorbent material according to claim 1.

* * * * *